(12) United States Patent
Teraoka

(10) Patent No.: US 7,570,014 B2
(45) Date of Patent: Aug. 4, 2009

(54) BATTERY PACK AND ELECTRONIC EQUIPMENT HAVING A DISCRIMINATION FUNCTION TO DETERMINE BATTERY PACK TYPE

(75) Inventor: Hiroki Teraoka, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 262 days.

(21) Appl. No.: 11/651,047

(22) Filed: Jan. 9, 2007

(65) Prior Publication Data

US 2007/0159135 A1     Jul. 12, 2007

(30) Foreign Application Priority Data

Jan. 11, 2006   (JP)   ............................. 2006-004213

(51) Int. Cl.
*H01M 10/46* (2006.01)
(52) U.S. Cl. ........................................... 320/106
(58) Field of Classification Search ............... 320/106, 320/107, 110, 112
See application file for complete search history.

(56) References Cited

U.S. PATENT DOCUMENTS 5,627,449 A * 5/1997 Fujiki ........................ 320/106
2005/0057216 A1 3/2005 Yamaguchi et al.

FOREIGN PATENT DOCUMENTS

JP    2005-93109    4/2005

* cited by examiner

*Primary Examiner*—Edward Tso
(74) *Attorney, Agent, or Firm*—Wenderoth, Lind & Ponack, L.L.P.

(57) ABSTRACT

The battery pack is charged by an electronic equipment and communicates with the electronic equipment. The battery pack is provided with a discrimination resistor electrically connected to communication lines, and a controller having a discrimination function for electronic equipment judgment of battery pack type from communication via the communication lines. The electronic equipment has a discrimination function that determines battery pack type utilizing the discrimination section of the battery pack controller. In addition, the electronic equipment has a discrimination function that applies voltage to the discrimination resistor to determine battery pack type.

8 Claims, 3 Drawing Sheets

BATTERY PACK AND ELECTRONIC EQUIPMENT HAVING A DISCRIMINATION FUNCTION TO DETERMINE BATTERY PACK TYPE

BACKGROUND OF THE INVENTION

1. Field of the Invention

This invention relates to a battery pack and electronic equipment.

2. Description of the Related Art

In prior art, a thermistor, which is a temperature-sensing element, is housed in the battery pack. Battery pack temperature is measured at the electronic equipment side (for example, at an electric tool, a battery charger, a notebook computer, etc.) via a temperature terminal, which is a battery pack connection terminal, and various types of control are performed.

Meanwhile, battery packs with microprocessor units as controllers are provided with the ability to communicate with the electronic equipment side (refer to Japanese Patent Application Disclosure 2005-93109). This function allows capabilities such as computation and display of remaining capacity, and battery pack identification (ID), which confirms whether the battery pack is specified product (or preferred product, or authentic product).

Besides this type of battery pack identification via digital signal communication, preferred battery pack determination is also performed by electronic equipment applying a voltage to a discrimination resistor inside the battery pack and reading a proper voltage-divided value for a preferred product.

SUMMARY OF THE INVENTION

However, if electronic equipment provided with battery pack identification capability attempts to charge a battery pack that uses a discrimination resistor, the electronic equipment will not determine the battery pack is a preferred product because it cannot determine battery pack identification via communication, and it will not perform charging.

The present invention was developed to resolve this type of problem. Thus, for electronic equipment that performs charging, it is an object of the present invention to provide a battery pack that can be charged even by electronic equipment that employs a different method to determine battery pack type.

The battery pack is charged by electronic equipment and the battery pack communicates with the electronic equipment. The battery pack comprises a discrimination resistor electrically connected to communication lines. The battery pack also comprises a controller with a discrimination section for electronic equipment judgment of battery pack type from communication via the communication lines.

Electronic equipment has a first discrimination function that determines battery pack type using the discrimination section of the battery pack controller.

In addition, electronic equipment may have a second discrimination function that applies voltage to the discrimination resistor to determine battery pack type.

Electronic equipment which determines battery pack type using the discrimination section of the controller, may have a voltage source that charges via a first charging voltage and a second charging voltage. When the applicable discrimination function finds a battery pack to be specified product, the electronic equipment performs constant voltage charging with a first charging voltage. If the discrimination function does not find the battery pack to be specified product but another discrimination method finds it to be specified product, the electronic equipment performs constant voltage charging with a second charging voltage, which is lower than the first charging voltage.

In the present invention, for an electronic equipment side that judges battery pack type via communication, the discrimination section of the battery pack controller is used to distinguish the electronic equipment and battery pack. For an electronic equipment side that judges battery pack type by using the discrimination resistor housed in the battery pack, the discrimination resistor is used to distinguish the electronic equipment and battery pack. As a result, for the battery pack of the present invention, charging can be performed with electronic equipment that uses different methods of determining battery pack type.

For electronic equipment with a discrimination function that uses the discrimination section of the battery pack controller, the electronic equipment performs constant voltage charging with the first charging voltage when the battery pack is found to be specified product. When the battery pack is not found to be specified product by that discrimination method, the electronic equipment can perform constant voltage charging with the second charging voltage, which is lower than the first charging voltage. By providing a voltage source that generates both the first and second charging voltages, suitable charging voltage can be provided for each type of battery pack in the case where proper charging voltage is different depending on the battery pack. The above and further objects of the present invention as well as features thereof will become more apparent from the following detailed description to be made in conjunction with the accompanying drawings.

DETAILED DESCRIPTION OF THE PREFERRED EMBODIMENTS

Figure 1:
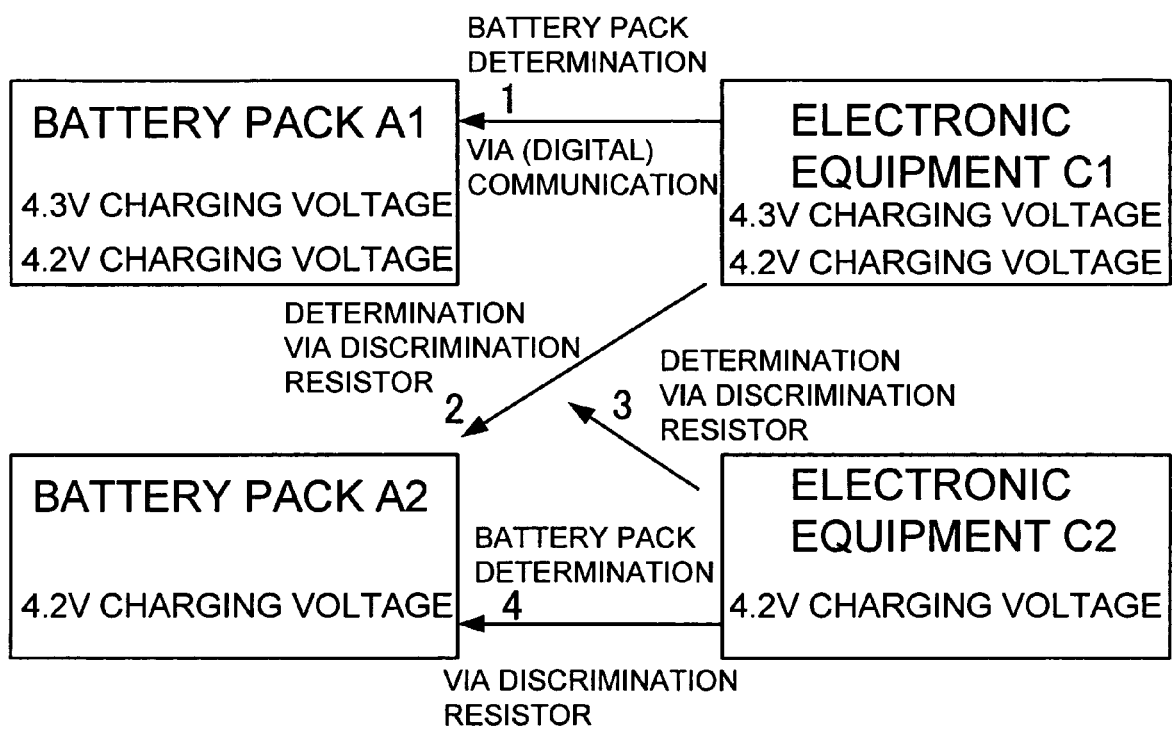
FIG. 1 is a diagram summarizing embodiments of the present invention.

The following describes in detail embodiments of the present invention referring to the drawings. Summary of these embodiments is described referring to FIG. 1. A battery pack A1 of the present invention, which is provided with a discrimination resistor Rs and a controller having a (digital) discrimination function, and a battery pack A2 having a discrimination resistor Rs, which is used in prior art, can be used as the battery pack. The battery pack A1 houses lithium ion batteries 1 that can be charged at a high voltage (first charging voltage about 4.3V). The battery pack A2 houses lithium ion batteries 1 that can be charged at the prior art low voltage (second charging voltage about 4.2V).

The following electronic equipment contain a power source that charges lithium ion batteries 1 by well-known constant current, constant voltage charging, and can be used as electronic equipment with the capability to charge a battery pack. Electronic equipment C1 can be used, which has a (digital) discrimination function that determines battery pack type using the discrimination function of the controller of battery pack A1 described above. In this electronic equipment C1, the high charging voltage (first charging voltage about 4.3V) is supplied. Electronic equipment C1 is provided with a voltage source that also supplies the low charging voltage (second charging voltage about 4.2V) when a low charging voltage battery pack A2, which has a discrimination resistor Rs, is attached. In addition, electronic equipment C2 can be used, which has a discrimination function that determines battery pack type by applying voltage to the discrimination resistor Rs of battery pack A2 described above. In this electronic equipment C2, the low charging voltage (second charging voltage about 4.2V) is supplied.

The discrimination and charging processes of these types of battery packs A1, A2 and electronic equipment C1, C2 are described below referring to FIG. 1. When electronic equipment C1, which has a digital discrimination function, charges battery pack A1, which has a discrimination resistor Rs and a digital discrimination function, both employ the digital discrimination function to determine if the battery pack A1 is specified product. When the battery pack A1 is determined to be specified product, the electronic equipment C1 performs charging with the high charging voltage (first charging voltage about 4.3V) (arrow 1 in FIG. 1). When electronic equipment C1, which has a digital discrimination function, charges battery pack A2, which has a discrimination resistor Rs, the electronic equipment C1 recognizes the digital discrimination function does not work and determines if the battery pack A2 is specified product from the discrimination resistor Rs voltage. When the battery pack A2 is determined to be specified product, the electronic equipment C1 performs charging with the low charging voltage (second charging voltage about 4.2V) (arrow 2 in FIG. 1).

When electronic equipment C2, which judges battery pack type using the discrimination resistor Rs, charges a battery pack A1, which has a discrimination resistor Rs and a digital discrimination function, the electronic equipment C2 determines if the battery pack A1 is specified product from the discrimination resistor Rs voltage. When the battery pack A1 is determined to be specified product, the electronic equipment C2 performs charging with the low charging voltage (second charging voltage about 4.2V) (arrow 3 in FIG. 1). When electronic equipment C2, which judges battery pack type using the discrimination resistor Rs, charges a battery pack A2, which has a discrimination resistor Rs, the electronic equipment C2 determines if the battery pack A2 is specified product from the discrimination resistor Rs voltage. When the battery pack A2 is determined to be specified product, the electronic equipment C2 performs charging with the low charging voltage (second charging voltage about 4.2V) (arrow 4 in FIG. 1). Here, if the battery pack is not specified product, it can be a copy or imitation product. It can also be the wrong type of product, etc.

Figure 2:
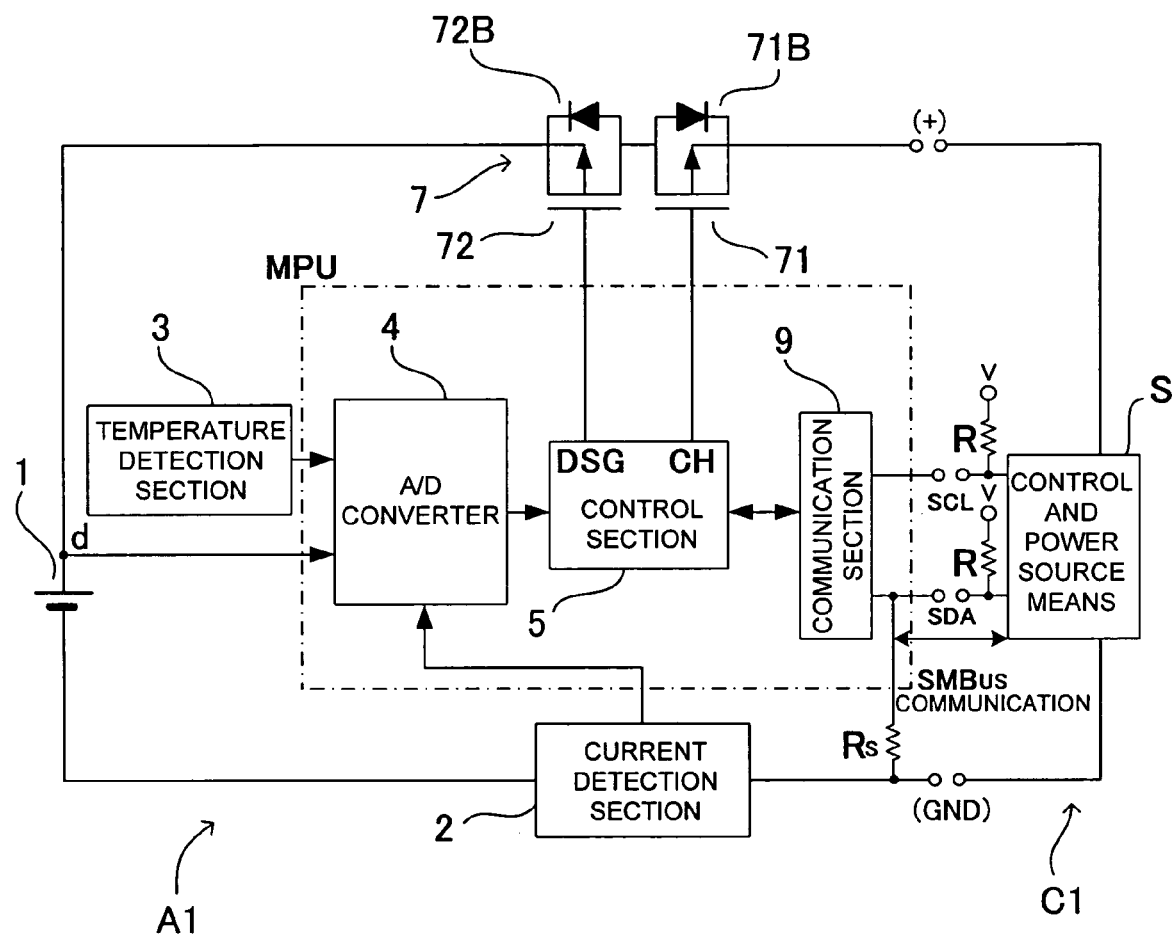
FIG. 2 is a circuit block diagram of a battery pack and electronic equipment of an embodiment of the present invention.

Embodiments of the present invention are further described in detail referring to the drawings as follows. As shown in FIG. 2, an embodiment is provided with a battery pack A1 and electronic equipment C1, which is equipped with a power source to charge the battery pack A1. The electronic equipment C1 may be a notebook-type portable personal computer or a battery charger. Normally the battery pack A1 is configured to freely attach to, and detach from electronic equipment C1. In the electronic equipment C1, commercial alternating current (AC) from an electrical outlet is converted to direct current (DC) power by an adapter (not illustrated) to supply DC power output. The electronic equipment C1 is provided with a control and power source means S that houses a microprocessor to control and supply the DC power. Power output from the control and power source means S is used to charge the battery pack A1.

Electronic equipment C1 is provided with the capability to send and receive data signals via two communication lines, which are the data line SDA and the clock line SCL. A power source V (5V) is supplied from a power source section (not illustrated) provided in the control and power source means S and connected through resistors R to terminal nodes of the communication lines. When the battery pack is determined to be specified product via communication with the control and power source means S, charging is performed at the constant voltage of the first charging voltage (about 4.3V). When the battery pack is not determined to be specified product via communication, including when the battery pack cannot be determined to be specified product or when communication is not possible, charging is not begun at this time. Next, the control and power source means S determines if the battery pack is specified product by measuring the voltage divider voltage V×Rs/(Rs+R) due to the discrimination resistor Rs. When the battery pack is determined to be specified product, the control and power source means S begins charging with the low voltage (second charging voltage about 4.2V). If the battery pack is not determined to be specified product, the control and power source means S of the electronic equipment C1 does not begin charging.

Electronic equipment C1 is provided with a voltage source for charging with the first charging voltage, and with the second charging voltage, which is a constant voltage lower than the first charging voltage. For a voltage source that can change the voltage setting for constant voltage charging following constant current charging in constant current-constant voltage charging of lithium batteries, circuits can be adopted such as that disclosed in FIG. 5 of Japanese Patent Application HEI 8-205418 (1996) by the present applicant.

As shown in FIG. 2, the battery pack A1 of the present embodiment is provided with rechargeable batteries 1 such as lithium ion rechargeable batteries, a current detection section 2 (current sense resistor) to detect current during battery 1 charging and discharging, and a microprocessor unit (MPU) that is a controller to perform tasks such as monitoring and controlling battery 1 charging and discharging. In addition, a temperature detection section 3 including a thermistor disposed in close contact with the batteries 1 is provided inside the battery pack A1. When the battery pack A1 is attached to electronic equipment C1, output from the batteries 1 is supplied through the positive (+) terminal and ground (GND) terminal, and communication with the electronic equipment C1 is conducted via communication line terminals SCL, SDA. In the present embodiment, a microprocessor is used as the controller, but a plurality of integrated circuits (IC's), which are not microprocessors, may also be used.

The MPU is provided with an A/D converter 4 to convert analog battery voltage and analog voltage from the current detection section 2 to digital format and to actual voltage [mV] and actual current [mA] values. The MPU is also provided with a control section 5 to integrate charging and discharging current and compute remaining battery capacity, to detect battery 1 full charge, and to control charging and discharging when abnormal current, temperature, or voltage is detected. A control device 7, such as a switching transistor, is controlled on and off, and cuts-off current via a control signal from the control section 5 when abnormal current, temperature, or voltage is detected. In short, the control device 7 sets the state of current supply or cut-off. In the control section 5, charging and discharging current converted by the A/D converter section 4 is multiplied by the measurement sampling-time period (for example, 250 msec), and those resulting values are integrated. During discharging, integrated values are subtracted from full charge, and during charging, integrated values are added to the remaining capacity at the start of charging. By these types of computations, remaining capacity of the batteries 1 is determined.

To cut-off charging current or discharging current, the control section 5 issues ON and OFF signals to a charging FET device 71 and a discharging FET device 72, which are p-channel FET devices. To control the charging FET device 71 OFF when battery 1 voltage becomes greater than or equal to an over-charging voltage (equal to or more than the first charging voltage, 4.3V), the control section 5 issues an OFF signal from the port CH (since the charging FET device 71 is a p-channel FET, an OFF signal voltage is a HIGH level signal applied to the gate). Here, when the control section 5 detects the discrimination function via (digital) communication is not being utilized, charging with the low voltage (second charging voltage about 4.2V) is assumed, and the over-charging voltage is changed to the second charging voltage (equal to or less than about 4.2V).

Similarly, to control the discharging FET device 72 OFF when battery 1 voltage becomes less than or equal to an over-discharging voltage (for example, 2.3 V/cell), the control section 5 issues an OFF signal from the port DSG (since the discharging FET device 72 is a p-channel FET, an OFF signal voltage is a HIGH level signal applied to the gate). As mentioned, since signals are applied to the gates of p-channel FET devices 71, 72, OFF signals are HIGH-level signals and ON signals are LOW-level signals. In an over-charging situation, an OFF signal is issued from the control section 5 CH port to suspend charging. At this point, if the electronic equipment C1 is discharging, the discharging FET device 72 can be in the ON state because DSG is an ON signal. In this case, discharge can occur via the parasitic (=body) diode 71 B of the OFF state charging FET device 71. Similarly, in an over-discharging situation, an OFF signal is issued from the control section 5 DSG port to suspend discharging. At this point, if the electronic equipment C1 is charging, the charging FET device 71 can be in the ON state because CH is an ON signal. In this case, charging can occur via the parasitic (=body) diode 72B of the OFF state discharging FET device 72.

The control section 5 detects full charge from battery voltage and charging current converted by the A/D converter section 4, and outputs full charge information indicating remaining capacity at 100%. (For current or voltage restrained by constant current charging and constant voltage charging, full charge is determined by voltage at or above a set value or by current at or below a set value respectively.) Full charge information can also be sent to the electronic equipment C1 C1 via the communication lines.

Communication with electronic equipment C1 is performed in the communication section 9 as follows. The communication section 9 is provided with a communication data generation section to construct data signals that can be received by the electronic equipment C1, and that contain various information such as battery pack identification, battery voltage, remaining capacity, and charging and discharging current values. A communication driver section is provided to execute actual communication with the electronic equipment C1. Memory is provided to store various parameters for computing remaining capacity and to store various data. The communication driver section receives requests from the electronic equipment C1 for transmission of various battery pack information, and data signals generated by the communication data generation section are sent to the electronic equipment C1 from the communication driver section. A well-known interface technology such as the SMBus can be used as the communication method, and data transmission and reception functions are established over two communication lines, which are the data line SDA and the clock line SCL. In addition, the battery pack A1 has a discrimination resistor Rs electrically connected between the data line SDA and ground (GND). In FIG. 2, the discrimination resistor Rs and data line SDA can be connected inside the communication section 9 or external to it. Further, when the discrimination resistor Rs is not being used, a switching device can be added to prevent SDA current from flowing to GND through the discrimination resistor Rs.

Figure 3:
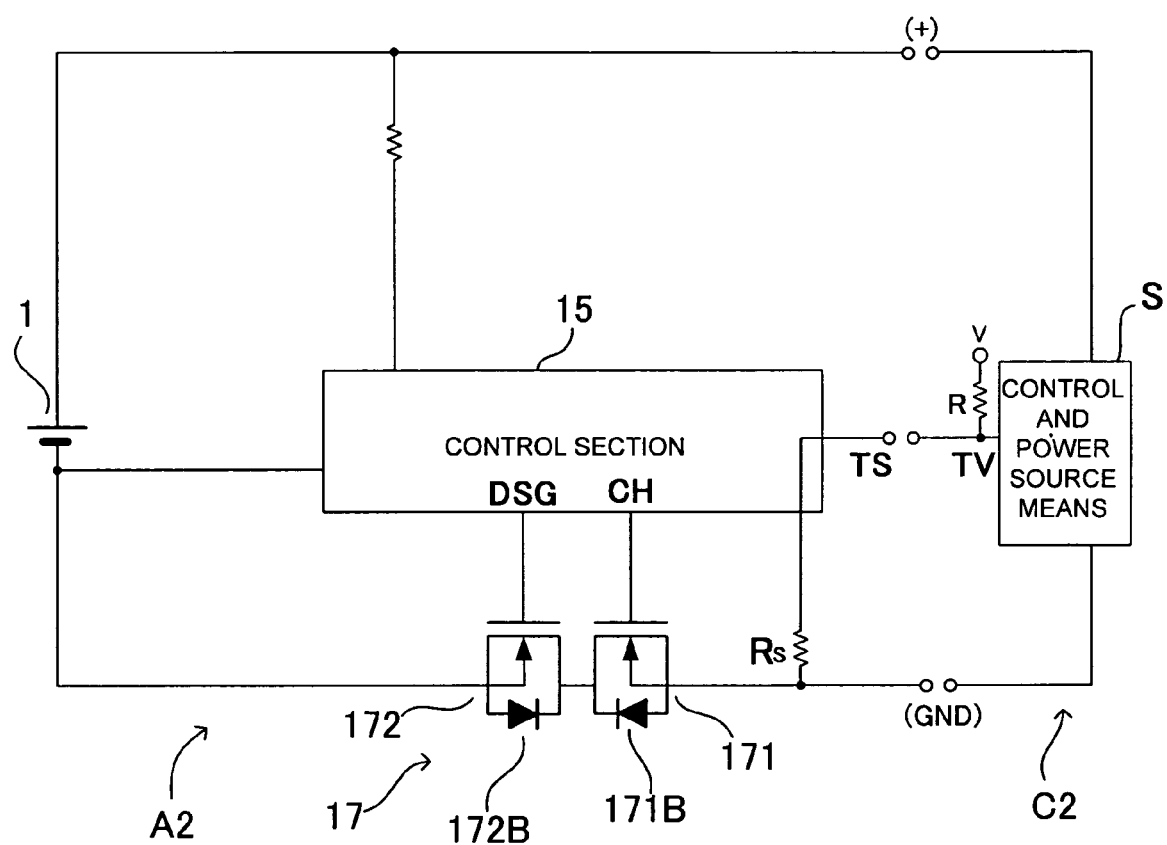
FIG. 3 is a circuit block diagram of another battery pack and electronic equipment of an embodiment of the present invention.

Next, FIG. 3 shows a battery pack A2 and electronic equipment C2, which is equipped with a power source to charge the battery pack A2. The electronic equipment C2 may be a notebook-type portable personal computer or a battery charger. Normally the battery pack A2 is configured to freely attach to, and detach from electronic equipment C2. In the electronic equipment C2, commercial AC from an electrical outlet is converted to DC power by an adapter (not illustrated) to supply DC power output. The electronic equipment C2 is provided with a control and power source means S that houses a microprocessor to control and supply the DC power. Power output from the control and power source means S is used to charge the battery pack A2.

Electronic equipment C2 has a power source V (5V), which is supplied from a power source section (not illustrated) provided in the control and power source means S, connected through resistor R to supply voltage and power to the discrimination resistor Rs of the battery pack A2 (or battery pack A1). Power is supplied from the power source V in the electronic equipment C2 via resistor R, terminal TV, and terminal TS to the discrimination resistor Rs in the battery pack A2. The control and power source means S determines if the battery pack is specified product by measuring the voltage divider voltage V×Rs/(Rs+R) due to the discrimination resistor Rs. When the battery pack is determined to be specified product, the control and power source means S begins charging (at about 4.2V). If the battery pack is not determined to be specified product, the control and power source means S of the electronic equipment C2 does not begin charging. In FIG. 3, the line connecting discrimination resistor Rs and terminal TS can be connected and routed inside the control section 15 or external to it.

Battery pack A2 is provided with rechargeable batteries 1 such as lithium ion rechargeable batteries, and a control section 15, which is a protection IC, to prevent over-charging and over-discharging of the batteries 1. To cut-off charging current or discharging current, the control section 15 issues ON and OFF signals to a charging FET device 171 and a discharging FET device 172, which are n-channel FET devices. To control the charging FET device 171 OFF when battery 1 voltage becomes greater than or equal to an over-charging voltage (>the second charging voltage, 4.2V), the control section 15 issues an OFF signal from the port CH (since the charging FET device 171 is a n-channel FET, an OFF signal voltage is a LOW level signal applied to the gate). Similarly, to control the discharging FET device 172 OFF when battery 1 voltage becomes less than or equal to an over-discharging voltage (for example, 2.3 V/cell), the control section 15 issues an OFF signal from the port DSG (since the discharging FET device 172 is a n-channel FET, an OFF signal voltage is a LOW level signal applied to the gate). As mentioned, since signals are applied to the gates of n-channel FET devices 171, 172, OFF signals are LOW-level signals and ON signals are HIGH-level signals. In an over-charging situation, an OFF signal is issued from the control section 15 CH port to suspend charging. At this point, if the electronic equipment C2 is discharging, the discharging FET device 172 can be in the ON state because DSG is an ON signal. In this case, discharge can occur via the parasitic (=body) diode 171 B of the OFF state charging FET device 171. Similarly, in an over-discharging situation, an OFF signal is issued from the control section 15 DSG port to suspend discharging. At this point, if the electronic equipment C2 is charging, the charging FET device 171 can be in the ON state because CH is an ON signal. In this case, charging can occur via the parasitic (=body) diode 172B of the OFF state discharging FET device 172.

In an embodiment of the present invention, battery pack A1 is connected to electronic equipment C1 and charging proceeds by the following steps (arrow 1 of FIG. 1). Power source V is supplied to the communication lines from the power source section of the control and power source means S. A request signal for identification information to determine if battery pack A1 is specified product (for example, information indicating the battery pack model name) is sent to the battery pack A1 via the communication lines. By receiving this request signal, the control section 5 of the battery pack A1 judges the electronic equipment C1 to be specified product. Next, the battery pack A1 control section 5 responds to the request signal by retrieving ID information stored in memory and sending it to the electronic equipment C1 side. The control and power source means S of the electronic equipment C1 verifies the ID information, and if it is confirmed to be specified product information, charging is begun. If the battery pack is determined not to be specified product, the electronic equipment C1 control and power source means S does not begin charging.

When battery pack A1 is connected to electronic equipment C2, charging proceeds by the following steps (arrow 3 of FIG. 1). The power source terminal TV of the electronic equipment C2 is connected to the data line terminal SDA of battery pack A1. Power source V is supplied to the battery pack A1 data line SDA terminal region from the power source section of the control and power source means S. The control and power source means S detects the voltage divider voltage due to the discrimination resistor Rs connected to the data line SDA of the battery pack A1. If the battery pack A1 is determined to be specified product, the control and power source means S begins constant current, constant voltage (about 4.2V) charging. Here, the control section 5 of the battery pack A1 detects that the discrimination function via (digital) communication is not being used, assumes that charging is by the low second charging voltage, and changes the over-charging voltage level to the second charging voltage (equal to or less than about 4.2V).

In an embodiment of the present invention, battery pack A2 is connected to electronic equipment C2 and charging proceeds by the following steps (arrow 4 of FIG. 1). Power source V is supplied to the battery pack A2 terminal TS from the power source section of the control and power source means S. The control and power source means S detects the voltage divider voltage due to the discrimination resistor Rs, and if the battery pack A2 is determined to be specified product, the control and power source means S begins constant current, constant voltage (about 4.2V) charging.

In an embodiment of the present invention, battery pack A2 is connected to electronic equipment C1 and charging proceeds by the following steps (arrow 2 of FIG. 1). Power source V is supplied to the battery pack A2 terminal TS from the power source section of the control and power source means S. As described previously, since the control and power source means S cannot communicate with the battery pack A2, the battery pack A2 cannot be determined to be specified product by (digital) communication. At this point charging is not begun. Next, the control and power source means S determines if the battery pack is specified product by measuring the voltage divider voltage V×Rs/(Rs+R) due to the discrimination resistor Rs. If the battery pack A2 is determined to be specified product, the control and power source means S begins charging at the low voltage (second charging voltage about 4.2V). If the battery pack is determined not to be specified product, the electronic equipment C1 control and power source means S does not begin charging.

Finally, lithium ion batteries that can be charged at high voltage are explained below. Lithium ion batteries that can be charged at low voltage (about 4.2V) have been produced for some time. Lithium ion batteries that can be charged at a higher voltage than prior art batteries have been used recently. The new batteries use a mixture of Li—Ni—Mn—Co composite oxide and cobalt-acid-lithium in the anode. This is different from prior art batteries, which used only cobalt-acid-lithium in the anode. The new material has high thermal stability even when charged at high voltage, can be charged at a maximum charging voltage of about 4.3V, and has higher capacity due to the higher voltage. As a result, high voltage battery chargers (with maximum output voltage about 4.3V) are used for these high voltage batteries.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-4213 filed in Japan on Jan. 11, 2006, the content of which is incorporated herein by reference.

What is claimed is:

1. A battery pack that is capable of being charged by and communicating with electronic equipment, the battery pack comprising:
    a rechargeable battery;
    a communication line to connect and communicate with the electric equipment;
    a discrimination resistor electrically connected to said communication line; and
    a controller having a discrimination section to output a discrimination signal to the electronic equipment,
    wherein said communication line serves two discrimination functions to discriminate a type of the connected electronic equipment and/or battery pack, the two functions being (1) a first discrimination function by communicating with the electronic equipment via said communication line and digitally processing, and (2) a second discrimination function by applying a voltage to said discrimination resistor.

2. The battery pack as recited in claim 1 wherein said rechargeable battery is a lithium ion battery.

3. Electronic equipment that capable of charging a battery pack, the electronic equipment comprising:
    a communication line to connect and communicate with the battery pack to serve two discrimination functions to determine battery pack type thereby; and
    a control and power source circuit that charges a rechargeable battery housed in the battery pack,
    wherein the discrimination functions include (1) a first discrimination function that is a digital discrimination function that determines battery pack type via communication with the battery pack, and (2) a second discrimination function that applies a voltage to a discrimination resistor in the battery pack to determine battery pack type, and wherein said control and power source circuit charges a battery pack determined to be a specified product by either or both the first discrimination function and the second discrimination function, and does not charge a battery pack determined not to be the specified product.

4. The electronic equipment as recited in claim 3 wherein said control and power source circuit charges a battery pack, which is determined to be specified product by the first discrimination function, with a first charging voltage; and charges a battery pack, which is not determined to be specified product by the first discrimination function but is determined to be specified product by the second discrimination function, with a second charging voltage.

5. The electronic equipment as recited in claim 4 wherein said control and power source circuit sets the second charging voltage lower than the first charging voltage.

6. The electronic equipment as recited in claim 4 wherein said control and power source circuit charges a battery pack housing lithium ion rechargeable batteries.

7. The electronic equipment as recited in claim 4 wherein the first charging voltage for charging a battery pack with said control and power source circuit is 4.3V.

8. The electronic equipment as recited in claim 4 wherein the second charging voltage for charging a battery pack with said control and power source circuit is 4.2V.

* * * * *